United States Patent [19]

Komatsu

[11] Patent Number: 4,859,199
[45] Date of Patent: Aug. 22, 1989

[54] CONNECTOR

[75] Inventor: Yasuhiro Komatsu, Osaka, Japan

[73] Assignee: Hosiden Electronics Co., Ltd., Osaka, Japan

[21] Appl. No.: 157,503

[22] PCT Filed: Jun. 18, 1987

[86] PCT No.: PCT/JP87/00403

§ 371 Date: Feb. 9, 1988

§ 102(e) Date: Feb. 9, 1988

[87] PCT Pub. No.: WO88/00401

PCT Pub. Date: Jan. 14, 1988

[30] Foreign Application Priority Data

Jun. 24, 1986 [JP] Japan ............... 61-96321

[51] Int. Cl.4 .................................. H01R 13/62
[52] U.S. Cl. .................................... 439/267
[58] Field of Search .......... 439/259, 260, 266, 267, 439/152, 159

[56] References Cited

U.S. PATENT DOCUMENTS

| | | | |
|---|---|---|---|
| 3,920,302 | 11/1975 | Cutchaw | 439/260 |
| 3,980,376 | 9/1976 | Rosen | 439/260 |
| 4,221,448 | 9/1980 | Logerot et al. | 439/260 |
| 4,448,466 | 5/1984 | Porter | 439/260 |
| 4,498,047 | 2/1985 | Hexamer et al. | 439/152 |
| 4,591,222 | 5/1986 | Shaffer | 439/267 |
| 4,713,020 | 12/1987 | Awano et al. | 439/267 |
| 4,735,578 | 4/1988 | Reichardt et al. | 439/267 |

FOREIGN PATENT DOCUMENTS

127684 9/1981 Japan .

Primary Examiner—Joseph H. McGlynn
Attorney, Agent, or Firm—Jones, Tullar & Cooper

[57] ABSTRACT

The invention relates to a connector for use in electrically connecting a ROM or IC card, or the like card to a main printed circuit board of an apparatus. In the connector, a movable member is mounted which causes a contact of the card to be resiliently contacted by a contact of a contactor portion connected to the main printed circuit board when the card is inserted a specified degree, and which causes the contact of the contactor portion to move away from the card a distance greater than the thickness of the card when the card is withdrawn. This arrangement involves no troublesome operation in connection with the expansion and contraction control of the contactor portion and can effectively prevent possible wear and deterioration of the contacts.

7 Claims, 6 Drawing Sheets

CONNECTOR

TECHNICAL FIELD

This invention relates to a connector for use in electrically connecting a ROM or IC card having a computer program stored therein to, for example, a computer equipped apparatus body.

BACKGROUND ART

The ROM card has a packaged construction such that a printed circuit board in which a ROM, with necessary connections, is provided has a contact provided on one side edge thereof, the contact being exposed outside so that when the ROM card is inserted into the connector, the printed circuit board of the ROM card is electrically connected to a main printed circuit board of the apparatus body.

Figure 8:
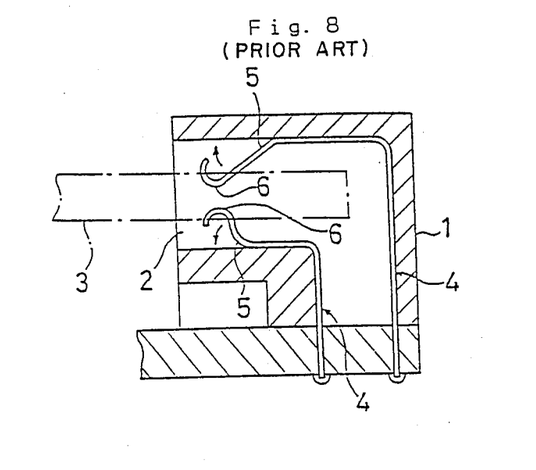
FIG. 8 is a cross sectional view of a prior art arrangement.

FIG. 8 shows a conventional connector. This connector is of such a construction that as a ROM card 3 is inserted into a card insertion port 2 of a body 1, contacts 6 having a curved shape are outwardly pushed away in a manner as indicated by the arrows, while being held in friction contact with the ROM card 3, the contacts 6 being individually formed as such in respective contactor portions 5 of conductor strips 4 accommodated in the body 1, and that when the ROM card 3 is brought to a set position, the contacts 6 are brought into resilient contact with the contact of the ROM card 3.

Figure 9:
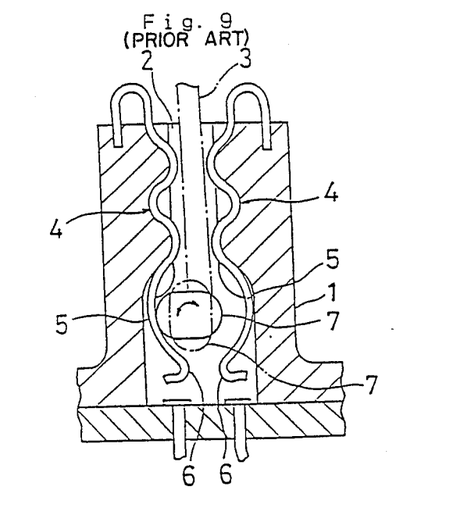
FIG. 9 is a cross sectional view of another prior art arrangement.

Another type of conventional connector, which is shown in FIG. 9, is of such arrangement that in a body 1 there is provided an expansion member 7 such that if it is rotated a given angle (e.g., 90 degree) in one direction so that conductor strips 4 accommodated in the body 1 are outwardly pushed away against the elastic force thereof, the contact of the ROM card 3 is not brought into friction contact with contacts 6 of the conductor strips 5 when the ROM card 3 is inserted into a card insertion port 2; and after the ROM card 3 is brought to its set position, by rotating the expansion member 7 over the given angle in the reverse direction as shown by a virtual line in FIG. 9 the contacts 6 are reset to their original position under the elastic force of respective contactor portions 5 of the conductor strips 4, whereupon the contacts 6 are brought into resilient contact with the contact of the ROM card 3.

In the FIG. 8 connector, however, if the contacts 6 of the conductor strips 4 are allowed to are brought into firm resilient contact with the contact of the ROM card 3 to ensure steady continuity, a larger insertion force is required when the ROM card 3 is inserted, which hampers ease of insertion and, in addition, involves vigorous friction between the contact of the ROM card 3 and the contacts 6 of the conductor strips 4 upon insertion and withdrawal of the ROM card 3, so that the contact or contacts of either side or both sides are likely to be worn out, their performance quality being thus unfavorably affected. On the other hand, if the preload of contactor portions 5 of the conductor strips 4 is reduced in an attempt to prevent such quality deterioration, it is likely that the contact pressure between the respective contacts will be excessively reduced, with the result of poor continuity. In the FIG. 8 connector, therefore, in order to minimize possible quality deterioration of the contacts and to provide good continuity, not only is it necessary to properly design the preload for the contactor portions 5, but also it is necessary to construct the conductor strips 4 of a costly high-performance spring material and further to upgrade the deposit thickness of the contacts 6; all this naturally leads to increaded cost of manufacture. Another problem is that since the ROM card 3 is placed outside the connector when not in use and since it is subject to frequent insertion and withdrawal, it is very likely to contact quality deterioration even if aforesaid measures are taken.

Whilst, in the FIG. 9 connector, if the contactor portions 5 of the conductor strips 4 are outwardly pushed away by the expansion member 7, the contact of the ROM card 3, upon each insertion or withdrawal, is unlikely to rub against the contacts 6 of the conductor strips 4, and therefore it is possible to provide a larger preload for the conductor strips 4 to ensure steady continuity; thus, such quality deterioration due to contact wearing as above mentioned is inhibited. However, this connector requires, as its indispensable components, the expansion member 7 and various parts for controlling same, and this makes the arrangement complicated. Further, for each insertion or withdrawal of the ROM card 3, the expansion member 7 has to be controlled, which is very troublesome.

The foregoing is also true in the case of an IC card being used instead of the ROM card.

SUMMARY OF THE INVENTION

Therefore, this invention is intended to overcome aforesaid difficulties and has as its primary object the provision of a connector which is easy to control and is less liable to deterioration of contact quality, by adoption of such arrangement that respective contactor portions of conductor strips are designed to be displaced in conjunction with the insertion or withdrawal of a ROM card.

In order to accomplish the foregoing object, the present invention provides a connector comprising:

a body having an insertion port for a contact-loaded card, a support portion provided in the interior of the body for engagement with conductor strips at their middle portions, a movable member provided in the interior which is slidable back and forth along a path for insertion and withdrawal of the card, there being disposed, between the movable member and the body, spring elements for constantly biasing the movable member in the forward direction thereof and lock mechanisms for positioning the movable member at a retreated position and at an advanced position, the conductor strips each having a contactor portion positioned forwardly of its portion in engagement with the support portion and disposed along the insertion and withdrawal path, the contactor portion having at the middle thereof a contact to be engaged by and disengaged from the contact of the card, the movable member having a stepped portion for abutment with the front end of the card when the card is inserted through the insertion port, and a cam face which raises the respective front ends of the contactor portions against their elastic force so as to enable the contacts of the contractor portions to move away from the contact of the card when the movable member is at its advanced position and which allows the front ends of the contactor portions to be reset under the elastic force thereof so as to enable the contacts of the contactor portions to go in contact with the contact of the card when the movable member is at its retreated position, the lock mechanisms being alternately switchable to a locked state in which the movable member is held at the retreated position and an unlocked state in which the movable member is allowed to slide from the retreated position to the advanced position, through repetition of push-in movement of the card brought in abutment with the stepped portion.

Therefore, according to such arrangement, when the card which is inserted through the insertion port of the body until its front end abuts the stepped portion of the movable member is further pushed in, the movable member is caused to retract to the retreated position against the biasing force of the spring elements, whereupon the lock mechanisms are switched over to the locked state so that the movable member is positioned at the retreated position. Through such a series of card insertion movement, the contacts of the conductor strips which have been held away from the contact of the card by the action of the cam face of the movable member are brought in resilient contact with the contact of the card only when the card is pushed in to the set position.

When the card at the set position is pushed in, the lock mechanisms are switched over to the unlocked state, and the movable member is caused to slide to the advanced position under the biasing force of the spring elements, whereupon the card is pushed out by the movable member. During this push-out movement, the contacts of the conductor strips are held away from the contact of the card by the action of the cam face.

According to the connector of the invention, therefore, the contacts of the conductor strips can be moved away from and into contact with the contact of the card by insertion and withdrawal of the card, without any particular control of the movable member. Thus, no troublesome control is required and greater ease of use can be obtained. Further, according to the invention, the contactor portions of the conductor strips which are disposed along the path for card insertion and withdrawal are resiliently displaced and reset at their front ends by the action of the cam face of the movable member, and therefore the contactor portions can be resiliently displaced and reset in smooth and reasonable manner. Therefore, the biasing force of the spring elements for biasing the movable member in its forward direction can be of a small magnitude, and thus ease of card insertion operation can be well assured.

DESCRIPTION OF THE PREFERRED EMBODIMENTS

Figure 1:
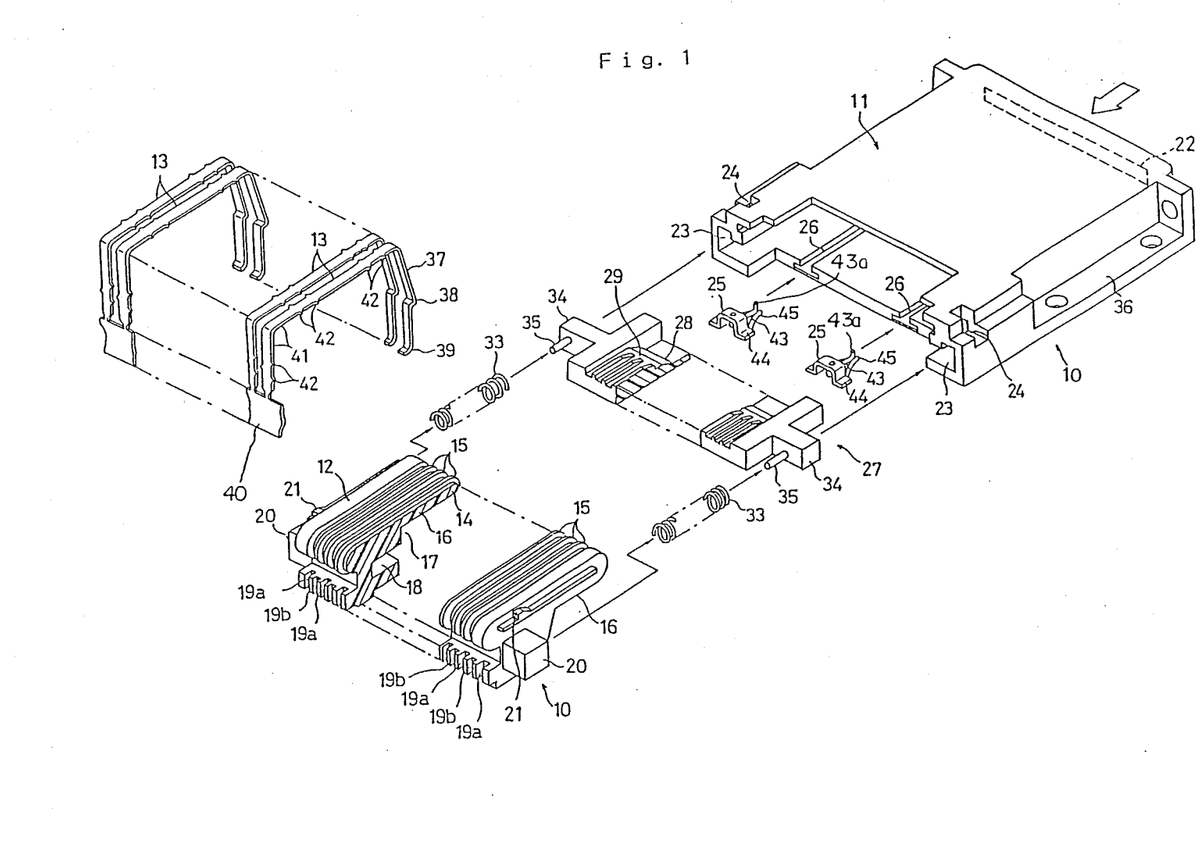
FIG. 1, is a partial cutaway exploded view in perspective of a connector according to one embodiment of the present invention.
Figure 2:
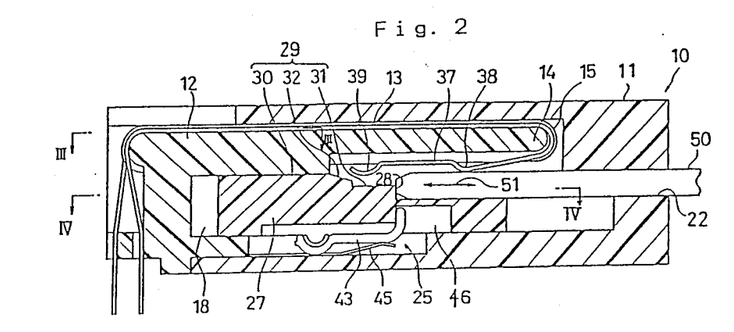
FIG. 2, is a cross sectional view showing an internal aspect of the connector.

The connector shown in FIGS. 1 and 2 is of a simplified assembly design and incorporates a special feature intended for preventing a plurality of conductor strips from going into contact with one another.

A body 10 of the connector consists of a combination of an outer body 11 and an inner body 12, both being of plastic molding. The inner body 12 has at its front end a support portion 14 by which conductor strips 13 are engaged at their middle portion, and also has a plurality of ribs 15 disposed in equi-spaced relation in the widthwise direction, the ribs 15 being present over an area covering the upper and lower surfaces of a protruding portion 16 of the inner body 12 through the rear end thereof. At the underside of the protruding portion 16 of the inner body 12 there are formed a recess 17 which is open at the under side and a recessed portion 18 which is open at the front. Further, at a lower portion of the rear end of the inner body 12 there are formed vertical grooves 19a, 19b of two different depths arranged at alternate intervals, and at sides of the inner body 12 there are provided projections 20 and pawls 21.

The outer body 11, being of a hollow box shape, has at its front side an insertion port 22 for insertion of a ROM card. The outer body 11 also has groove portions 23 into which the projections 20 of the inner body 12 are to be fitted, engagement grooves 24 for engagement with the pawls 21, and mounting grooves 26 for mounting lock mechanism components 25 which will be described hereinafter.

Numeral 27 designates a movable member (hereinafter referred to as "slider"). At its front end the slider 27 is formed with a stepped portion 28 for abutment with the front end of the ROM card, the upper surface of the stepped portion is formed as a cam face 29. As FIG. 2 illustrates in detail, the cam face 29 consists of a first flat surface 30, a second flat surface 31, the two surfaces being different in level, and a sloped guide surface 32 continued to the first flat surface 30. The first flat surface 30 is longer than the second flat surface 31 in the longitudinal direction, and it is partitioned by a multiplicity of ribs 15. On each side of the movable member 27 there is provided a laterally extending spring seat 34 for seating a spring element 33 comprised of a coil spring, there being provided a support pin 35 on the spring seat 34 integrally therewith. Shown by 36 is a flange for mounting the connector to a computer-equipped apparatus body.

Each of the conductor strips 13 is comprised of an elongate metal leaf and includes a contactor portion 37 located more adjacent to its front end than its portion for engagement with the support portion 14, the contactor portion 37 being bent in a check-mark pattern at its mid-portion to provide a contact 38. The front end of the contactor portion 37 is crooked to form a follower portion 39 corresponding to the cam face 29. As FIG. 1 shows, in their pre-assembly state, the conductor strips 13 are in such form that a multiplicity of them are connected to one another by tie bars 40. Each contactor portion 37 is bent at an angle close to a right angle to a lead portion 41. The lead portion 41 is formed with triangular projections 42 at given locations thereon.

The lock mechanisms 25 each consists of a pin 43, a mounting frame 44 fixed to a bottom wall of the outer body 11 for rotatably supporting the pin at one end thereof, a spring 45, and a guide groove 46 formed on the underside of the slider 27. The construction of the guide groove 46 will be further described hereinafter.

Figure 3:
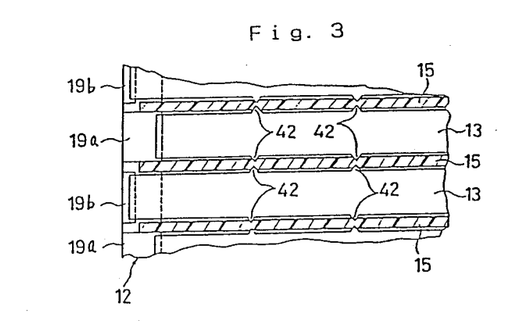
FIG. 3, is a cross sectional view taken along line III—III in FIG. 2.
Figure 4:
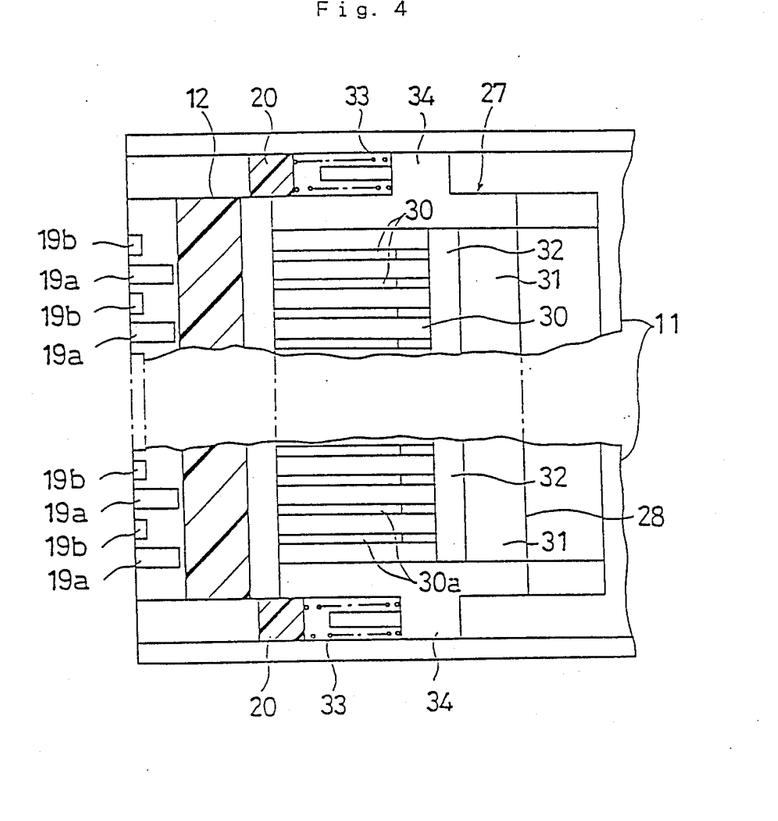
FIG. 4, is a cross sectional view taken along line IV—IV in FIG. 2.

The above mentioned outer body 11, inner body 12, slider 27, and the lock mechanisms 25 are assembled together as illustrated in FIG. 2. In their assembled condition, the inner body 12 is fitted in the outer body 11, with the slider 27 fitted in the recessed portion 18 of the inner body 12 so that it is slidable back and forth along the insertion/withdrawal path (shown by numeral 51) for ROM card 50. The front end of pin 43 of each lock mechanism is fitted in the guide groove 46, the pin 43 being constantly urged inwardly of the guide groove 46 by the spring 45. As FIG. 4 shows, the spring elements 33 each is interposed between the corresponding spring seat 34 of the slider 27 and the corresponding projection 20 of the inner body 12 so that it is constantly urging the slider in the forward direction thereof, i.e., toward the insertion port 22. The conductor strips 13 are individually fitted between corresponding adjacent ribs 15, 15 of the inner body 12, their respective contact portions 37 being bent so as for them to wrap around the protrudent portion 16 of the inner body 12 so that they extend along the insertion/withdrawal path 51 for ROM card 50. As shown in detail in FIG. 3, the projections 42 of each conductor strip 13 bite into adjacent ribs 15, thus serving to fix the lead portion 41 to the inner body 12 firmly and without looseness.

The guide groove 46 of each lock mechanism 25 will be explained with reference to FIGS. 6A-6C and 7. This guide groove 46 has a heart-shaped engagement portion 47, V-shaped guide faces 48a, 48b, and stepped portions 49a, 49b, 49c, 49d formed at four locations. By virtue of these stepped portions 49a, 49b, 49c, 49d, the pin 43 is guided in the specific direction only, being inhibited from relative movement in the reverse direction.

Next, the function of the above described connector will be explained.

Figure 5A:
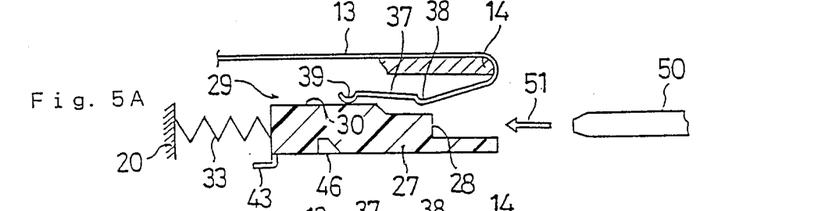
FIGS. 5A-5D, are subassembly views illustrating the operation of the slider of the present invention.

As FIG. 5A shows, when ROM card 50 is not inserted, the slider 27 has been pushed forward to the advanced position under the biasing force of the spring elements 33. Accordingly, the follower portion 39 of each conductor strip 13 follows the first flat portion 30 of the cam face 29 so that the contactor portion 37 is positioned on the flat portion 30 level. When the contactor portion 37 is in such raised position, the contact 38 of the conductor strip 13 is retreated to a location outside the insertion/withdrawal path 51 for ROM card 50. Therefore, upon insertion of ROM card 50, there is no rubbing contact between aforesaid contact 38 and the contact of the ROM card 50.

Figures 5B, 5C:
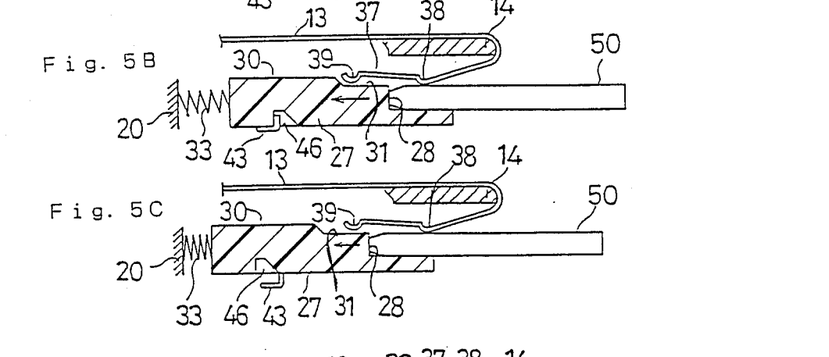

After the ROM card 50 is inserted into the insertion port 22 of the body 1 so that its front end comes into abutment with the stepped portion 28 of the slider 27, if the ROM card 50 is pushed further in as FIGS. 5B and 2 illustrate, the slider 27 retreats against the biasing force of the spring elements 33 to the retreated position, while the follower portion 39, just before the slider 27 reaches its retreated position, is displaced from the first flat portion 30 to a position on the second flat portion 31, whereupon the contact portion 37 makes entry into the insertion/withdrawal path 51. At this point of time, therefore, the contact 38 of the conductor 13 is brought into resilient contact with the contact of the ROM card 50. Thus, when the ROM card 50 pushes the slider 27 to the retreated position, the contact 38 of the conductor strip 13 is rubbed against the contact of the ROM card 50 while the ROM card 50 is pushed from a position immediately prior to the set position and to the set position. In this case, the mutual rubbing between the contacts serves for the purpose of the so-called self cleaning of contacts; indeed, such rubbing is convenient from the standpoint of good contact quality maintenance.

Figure 6A:
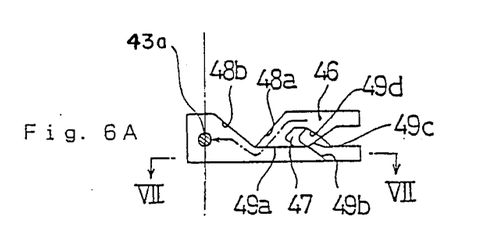
FIGS. 6A-6C, are detail views illustrating the operation of the lock mechanism of the present invention.
Figure 6B:
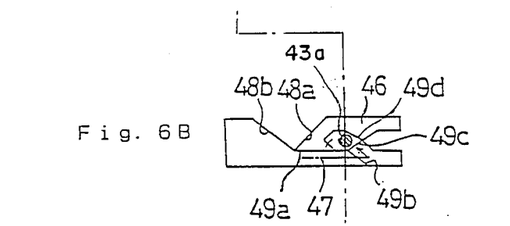

Meanwhile, through the above described series of ROM card insertion operation, the guide groove 46 of each lock mechanism 25 is displaced from the FIG. 6A position to the FIG. 6B position in relation to the pin 43, and the engagement portion 47 is brought into engagement with the pin 43 under the biasing force of the spring element 33 so that the lock mechanism is switched over to the lock state, the slider 27 being thus positioned in the retreated position. The ROM card 50 is set to the set position.

Figure 5D:
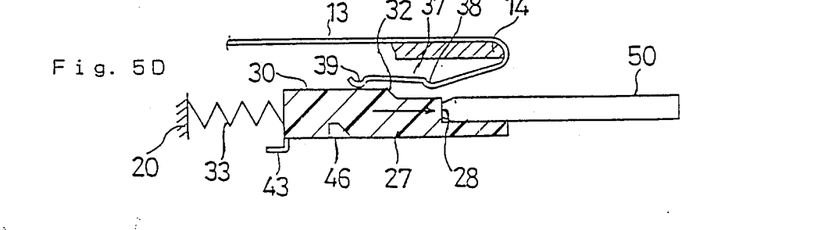
Figure 6C:
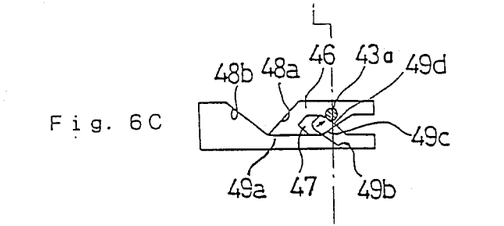
Figure 7:
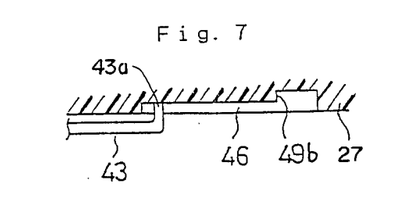
FIG. 7, is a section view taken along line VII—VII in FIG. 6A.

When the ROM card 50 in the set position as in FIG. 5C, is pushed in to further retreat the slider 27, the guide groove 46 of each lock mechanism 25 is displaced further rearward as FIG. 6C shows, so that the pin 43 is disengaged from the engagement portion 47, the lock mechanism being thus changed over to the unlocked state. Accordingly, the slider 27 is caused to slide from the retreated position to the advanced position under the biasing force of the spring element 33, and thus the ROM card 50 is pushed outward as FIG. 5D shows. In the meantime, the guide groove 46 of the lock mechanism 25 is reset from the FIG. 6C position to the FIG. 6A position, and the slider 27 is positioned to the advanced position. Following the slide movement of the slider 27, the follower portion 39 of each conductor strip 13 is guided by the guide face 32 to get on the first flat portion 30 and the contactor portion 37 is pushed against the elastic force thereof outwardly of the insertion/withdrawal path. During the course of the ROM card 50 being pushed in at the set position and up to the follower portion 39 being raised to the first flat portion 30, the contact of the ROM card 50 is rubbed by the contact of the conductor strips 13; but in the course of the operation subsequent to the time when the follower portion 39 is raised to the first flat portion 30, the contact 38 is held away from the contact of the ROM card 50. It is to be noted in this conjunction that the rubbing contact between the contacts at the initial stage in which the ROM card 50 is pushed out, as mentioned above, serves for the aforesaid self-cleaning purposes; such rubbing is desirable from the standpoint of good contact quality maintenance.

In the above described connector, the displacement of the contact portions 37, which takes place in conjunction with the slide movement of the slider 27, is effected as a pivotal movement about the engagement position of the conductor strips 13 relative to the support portion 14 of the inner body 12 or a position adjacent thereto. The follower portion 39 of each conductor strip 13 is provided at a location which is more remote from the pivotal position than the contact 38. Therefore, even if the preload of the contactor portions 37 is increased in order to allow the contacts 38 to move into more forceful resilient contact with the contact of the ROM card 50, the slide movement of the slider 27 can be effected with comparatively small force. From this it is apparent that if the spring force (biasing force) of the spring elements 33 is decreased, it is still possible to cause the slider 27 to be pushed forward steadily from the retreated position to the advanced position under the biasing force. In this way, the force for insertion of ROM card 50 can be set to a minimum.

The foregoing description is equally applicable to the case where an IC card is used instead of the ROM card 50.

As described above, even if a greater preload is applied to the contactor portions of the conductor strips, any contact wearing due to rubbing of contacts is less likely to occur, and thus the quality of contacts can be long maintained in good condition. Further, as compared with the conventional arrangement shown in FIG. 9, the invention has the advantage that such troublesome procedure as previously required is eliminated, it being thus possible to provide a connector which is easy to use and inexpensive to manufacture. Another advantage is that even if contacts are caused to go in more forceful resilient contact in order to ensure steady continuity, the force required for insertion of a card can be of a minimum magnitude. Therefore, when the invention is applied to a connector having a large number of contacts, ease of use can be greatly enhanced, because the force required for card insertion can be relatively small for the number of contacts involved.

INDUSTRAL APPLICABILITY

As above stated, the connector according to the invention is advantageously applicable for use in electrically connecting cards, such as a ROM card and an IC card, which are subject to frequent insertion and withdrawal, to a main printed circuit board of an electric apparatus.

I claim:

1. A connector for connecting with contact-loaded cards, comprising:
    a plurality of conductor strips each having a middle portion;
    a body defining an interior and an insertion port at one end for the insertion of a contact-loaded card into said interior, said body having a support portion for engagement with the conductor strips at their middle portion;
    a movable member situated within said interior for reciprocal movement toward and away from the insertion port;
    spring means for biasing the movable member toward the insertion port; and
    lock mechanisms for locking the movable member at a retreated position and at an advanced position, wherein:
    said conductor strips each further have a contactor portion positioned forwardly of its middle portion in engagement with said support portion and disposed in the direction of said reciprocal movement, each contactor portion having a front end and at the middle portion a contact to be engaged by and disengaged from a contact of the card;
    said movable member having a stepped portion for abutment with a front end of the card when the card is inserted through the insertion port, and a cam face which raises the respective front ends of the contactor portions against their elastic force so as to enable the contacts of the contactor portions to move away from contact with the card when the movable member is at its advanced position and which allows the front ends of the contactor portions to be reset under the elastic force thereof so as to enable the contacts of the contact portions to contact the contact of the card when the movable member is at its retreated position; and
    said lock mechanisms are alternately switchable to a locked state in which said movable member is held at the retreated position and an unlocked state in which said movable member slides from the retreated position to the advanced position, as a result of repetitive movement of a card brought into abutment with said stepped portion.

2. A connector as set forth in claim 1 wherein each of the lock mechanisms comprises a mounting frame fixed to said body, a pin rotatably supported in said mounting frame, and a guide groove formed on the movable member at one side thereof and in which said pin is inserted and guided to a lock position and to an unlocked position.

3. A connector as set forth in claim 1 wherein said body comprises an outer body having a hollow box shape and the card insertion port formed on the front wall thereof, and an inner body defining the support portion extending toward said card insertion port of the outer port of the outer body.

4. A connector as set forth in claim 3 wherein the movable member is fitted within the outer body together with the support portion of the inner body.

5. A connector as set forth in claim 3, wherein each conductor strip has its mid-portion disposed between adjacent ribs formed on the support portion at specified intervals in the widthwise direction thereof, said mid-portion being in engagement with the corresponding ribs.

6. A connector as set forth in claim 5 wherein the support portion has an inner-side base portion and wherein each conductor strip has its mid-portion placed from above between corresponding adjacent ones of the ribs of the support portion and held in engagement therewith, the mid-portion of the conductor strip being bent at its front end in a U-shaped pattern along the front end portion of the support portion so that the contactor portion of the conductor which is to be brought into opposed relation with the movable member extends toward the inner-side base portion of the support portion.

7. A connector as set forth in claim 6 wherein the contactor portion of each conductor strip which extends toward the inner-side base portion of the support portion is adapted to be positioned between ribs formed on the movable member.

* * * * *